US006715361B2

(12) United States Patent
Chiapuzzi et al.

(10) Patent No.: US 6,715,361 B2
(45) Date of Patent: Apr. 6, 2004

(54) SCREWER TEST BENCH COMPRISING A THIN DISK BRAKE

(75) Inventors: Angelo Chiapuzzi, Noviglio (IT); Luigi Bareggi, Milan (IT)

(73) Assignee: BLM S.a.s. di L. Bareggi & C., Milan (IT)

( * ) Notice: Subject to any disclaimer, the term of this patent is extended or adjusted under 35 U.S.C. 154(b) by 0 days.

(21) Appl. No.: 10/251,842

(22) Filed: Sep. 23, 2002

(65) Prior Publication Data

US 2003/0056564 A1 Mar. 27, 2003

(30) Foreign Application Priority Data

Sep. 25, 2001 (IT) ...................... MI2001A1993

(51) Int. Cl.[7] ................................. G01N 3/00
(52) U.S. Cl. ............................. 73/760; 73/763; 73/765; 73/777
(58) Field of Search .................... 73/760, 1.09, 862.08

(56) References Cited

U.S. PATENT DOCUMENTS

| 5,886,246 A | * | 3/1999 | Bareggi et al. ............... 73/1.09 |
| 2003/0056605 A1 | * | 3/2003 | Chiapuzzi et al. ....... 73/862.21 |
| 2003/0057034 A1 | * | 3/2003 | Chiapuzzi et al. ......... 188/71.1 |

* cited by examiner

*Primary Examiner*—Edward Lefkowitz
*Assistant Examiner*—Alandra N. Ellington
(74) *Attorney, Agent, or Firm*—Jacobson Holman PLLC

(57) ABSTRACT

A screwer test bench includes a coupling designed for connection with the head of a screwer and connected to a controlled braking unit and a sensor unit for detection of mechanical magnitudes transmitted between the coupling and the braking unit. The braking unit includes a thin cap constrained to said coupling at least in the direction of rotation and arranged between a first pressure surface thrust axially against the cap by an actuator and a second fixed opposition surface.

8 Claims, 2 Drawing Sheets ical side elevation view of a test bench in accordance with the present invention,

SCREWER TEST BENCH COMPRISING A THIN DISK BRAKE

BACKGROUND OF THE INVENTION

The present invention relates to a screwer test bench and in particular to a bench with an innovative brake for simulation of resisting torque.

Screwer test benches are well known in the prior art. Such benches simulate the resisting torque of a screw in tightening and at the same time measure the parameters of torque and angle developed by a screwer applied to the bench and signal deviations of said parameters from a predetermined characteristic curve.

In such benches correct simulation of resisting torque is the most critical part in order that the measurements made be truly representative of the operation of the screwer in normal use.

In accordance with a known system the bench comprises a cap with which is engaged the screwer being tested. A friction disk is thrust against the cap by means of a hydraulic actuator to produce the braking force.

Such known systems suffer from various disadvantages among which the high inertia of the brake and the friction and dragging of the running guides of the movable parts of the brake proved particularly important for the accuracy of bench measurements.

The problem of high inertia is due essentially to the fact that the brake cap is realized of relatively thick metal to support the axial forces developed when the friction disk is thrust against it. The problem of the running guides is due to the fact that all the torque produced by the screwer is unloaded on the friction disk which must therefore be locked against axial rotation. As the thrust cylinder cannot offer any resistance to rotation the disk runs along purposeful guides.

The holder of this application has found that such a structure is adequate for normal brakes whose only purpose is to stop a rotating shaft (for example vehicle brakes) but becomes very disadvantageous in the specific case of screwer measurement benches.

Indeed, the holder of this application has found that, in particular during the last moments before stopping, vibrations are produced which affect the consistency of braking at the most delicate moment of the cycle, i.e. at the moment of peak torque acquisition.

A conventional disk has a relatively high moment of inertia and therefore displays rather low resonance frequency. The standards for torque measurements in screwers require in general however that the measurements be executed with filters which cut only the frequencies above 500 Hz. Because of the moment of inertia, normal brake disks have however a resonance frequency below 500 Hz and therefore all the vibrations of the disk and the shaft to which it is rigidly keyed are transmitted to the torque transducer and the measurement system acquires oscillations in the torque peak which are the main cause of measurement repeatability errors.

The general purpose of the present invention is to remedy the above mentioned shortcomings by making available a screwer test bench having a braking system which reduces inertias and therefore increases resonance frequency. Anther purpose is to make available a bench with a braking system which reduces the problems owing to the need for opposition to the rotation produced by the braking forces.

SUMMARY OF THE INVENTION

In view of this purpose it was sought to provide in accordance with the present invention a screwer test bench comprising a coupling designed for connection with the head of a screwer and connected to a controlled braking unit and a sensor unit 15 for detection of mechanical magnitudes transmitted between the coupling and the braking unit characterized in that the braking unit comprises a thin cap constrained to said coupling at least in the direction of rotation and arranged between a first pressure surface thrust axially against the cap by an actuator and a second surface for fixed opposition.

BRIEF DESCRIPTION OF THE DRAWINGS

To clarify the explanation of the innovative principles of the present invention and its advantages compared with the prior art there is described below with the aid of the annexed drawings a possible embodiment thereof by way of non-limiting example applying said principles. In the drawings.

DETAILED DESCRIPTION OF THE INVENTION

Figure 1:
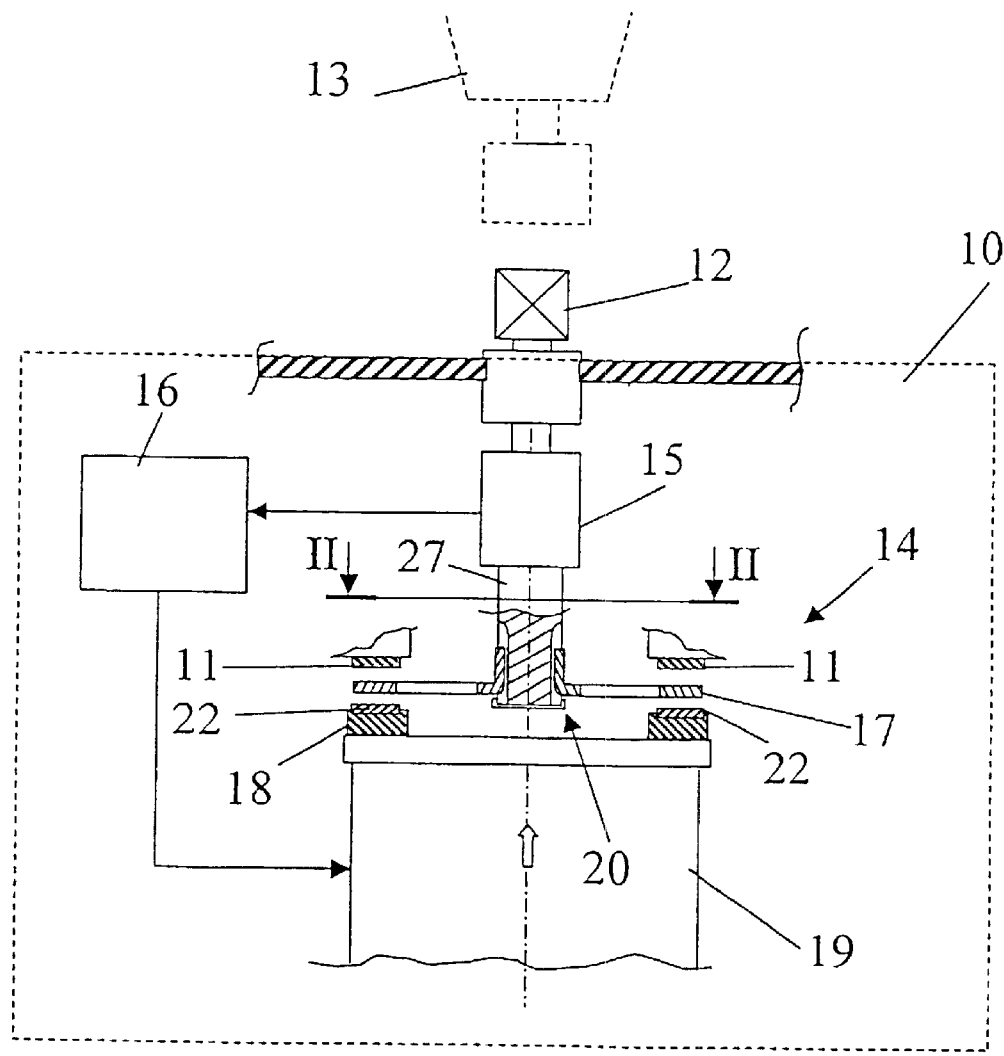
FIG. 1 shows a partially cross sectioned diagrammatic side elevation view of a test bench in accordance with the present invention.

With reference to the FIGS, FIG. 1 shows diagrammatically a cross section of a test bench designated as a whole by reference number 10. From the bench table projects a known coupling 12 designed for coupling with the head 13 of a known screwer to be tested.

The coupling 12 is connected by means of a shaft 27 to a braking unit 14 with interposition of a known torque and angle sensor unit 15. The sensor unit is connected to an acquisition and control device 16, for example with microprocessor, of the prior art and therefore not further shown nor described. During the testing phases of a screwer the device 16 appropriately commands the braking unit 14 and detects through the sensor unit 15 the characteristics of the screwer to establish its correspondence to previously established testing parameters. These measurements and verifications are known to those skilled in the art and therefore not further described nor shown.

The braking unit 14 comprises a cap 17 made to rotate by the screwer which is braked by appropriate friction surfaces by means of an actuator 19 advantageously of the hydraulic type.

Differently from known embodiments, the cap 17 is made with slight thickness as it is sufficient as will be seen that its rigidity be sufficient to resist the torsional forces around the axis of the shaft 27 imparted by the shaft rotation braking action.

The cap is mounted on the shaft through a running coupling 20 which allows axial running of the cap on the shaft with simultaneous mutual rotation locking. This can be obtained with appropriate grooves on the shaft and complementary couplings 25 in a collar 24 of the cap.

Figure 2:
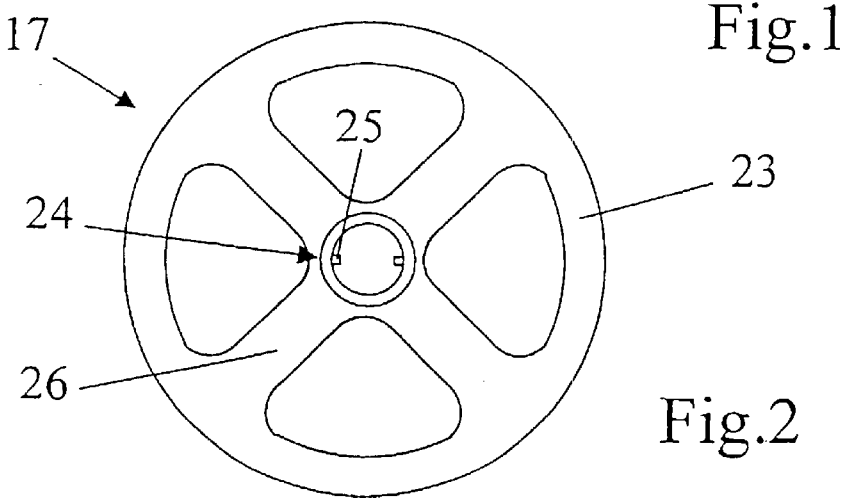
FIG. 2 shows a cross section view along plane of cut II—II of FIG. 1.

The cap can advantageously be realized by blanking from a steel sheet. To reduce the mass of the cap it can be made with an external ring 23, internal collar 24 and connecting spokes 26 as may be seen in FIG. 2.

The braking unit comprises on one side of the cap a thrust unit 18 driven by the actuator 19 with pressure surfaces 22 and on the other side fixed opposing surfaces 11. Upon operation of the actuator the cap has a periphery which is clamped between opposing surfaces 11, 22.

Although the two surfaces acting on the two sides of the cap can be friction surfaces, the at least partial separation of the thrust and braking functions is very advantageous to reduce the braking torque transmitted to the thrust actuator and to any running guides of the thrust unit.

For this reason, the movable surfaces 22 of the thrust unit are advantageously made in such a manner as to allow rotation of the cap during thrust so that the torsional forces transmitted by the cap to the thrust unit and thence to the actuator will be low. Advantageously such surfaces are realized with a suitable low friction material such as for example Teflon®.

In this manner the thrust unit transmits to any axial running guides (not shown) reduced forces and avoids dragging or axial running difficulties. At the worst, the running guides may be lacking.

The surfaces 11 are fastened to the brake unit frame and are made of a suitable friction material to realize the braking function of the cap. Since they are fastened to the frame, no braking torsional force is unloaded onto the thrust unit.

Of course the axial running of the peripheral part of the cap to allow its clamping between the opposing thrust and braking surfaces can even take place in a manner different from that shown.

Figure 3:
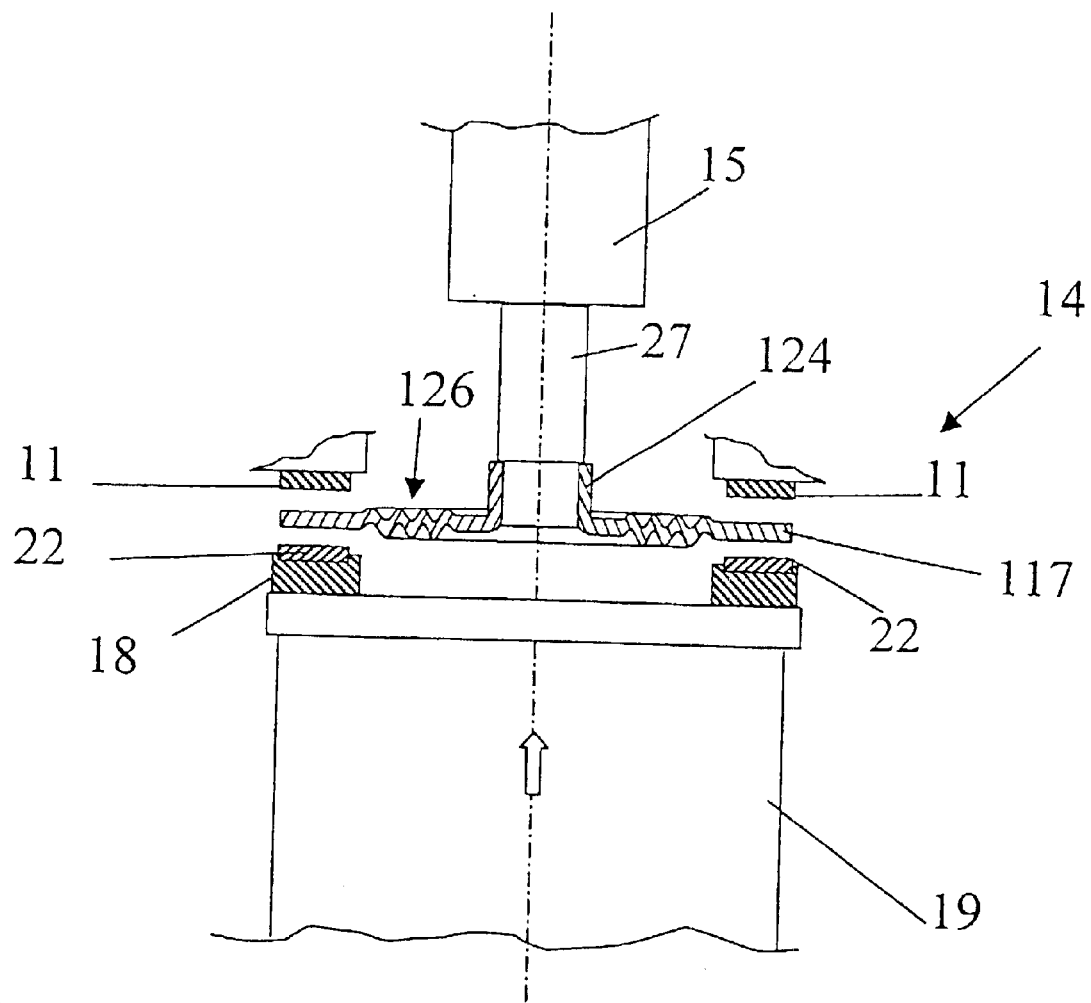
FIG. 3 shows a partially cross sectioned view of a detail of a variant embodiment of the bench in accordance with the present invention.

FIG. 3 shows a variant embodiment in which the axial movement of the cap peripheral part in contact with the thrust and braking surfaces during braking is obtained in a different manner with respect to the running sleeve 20 of FIG. 1.

As may be seen in FIG 3, in the variant embodiment the cap 117 has a collar 124 rigidly connected to the shaft (for example by means of gain with negative allowance) and the cap is realized with the part 126 between the collar and the external braking sector shaped with concentric solid or spoked undulations so as to allow elastic axial movement of the peripheral part of the cap with respect to the collar.

It is now clear that the predetermined purposes have been achieved. The thrust on the cap is symmetrical on the two sides and it can be made very light with minimal inertia with it being necessary that its structure resist also only the torsional torque of braking which being in the plane of the cap is well opposed even by a very thin cap provided it is of material of suitable characteristics such as steel.

In addition, vibrations, dragging and skipping caused by the guides in prior art systems are reduced. The fact that the braking unit has at least partially friction surfaces fastened to the ground causes them to effectively damp any vibrations produced on the cap during braking.

The disk can be made with moment of inertia sufficiently low to take its resonance frequency well above 500 Hz.

The slight thickness of the disk also allows it flexibility in the axial direction allowing compensation with the elasticity of any braking surface alignment errors which can appear in time due to wear, thus avoiding "cyclic" brakings which are usually generators of nuisances with sinusoidal character in the detection of measurements.

Naturally the above description of an embodiment applying the innovative principles of the present invention is given by way of non-limiting example of said principles within the scope of the exclusive right claimed here. For example the exact structure and proportions of the various parts of the bench as well as the existence or not of other prior art parts may vary depending on the specific requirements of the bench embodiment. Roller bearings can also be used for the pressure surfaces.

What is claimed is:

1. Screwer test bench comprising a coupling design for connection with the head of a screwer and connected to a controlled braking unit and a sensor unit for detection of mechanical magnitudes transmitted between the coupling and the braking unit, the braking unit comprises a cap constrained to said coupling at least in the direction of rotation and arranged between a first pressure surface thrust axially against the cap by an actuator and a second fixed opposition surface.

2. Bench in accordance with claim 1, wherein the cap runs axially to move towards the opposing surface when it is thrust by the pressure surface.

3. Bench in accordance with claim 1, wherein the cap has an intermediate zone between the periphery and a central sleeve for constraint to the coupling with said intermediate zone being undulated to allow elastic axial movement between the sleeve and the periphery when the periphery of the pressure surface is thus against the opposing surface.

4. Bench in accordance with claim 1, wherein the cap has a structure resistant to normal torsional stresses around the axis imposed by braking but is relatively flexible in the axial direction.

5. Bench in accordance with claim 1, wherein the cap is made of thin steel sheet.

6. Bench in accordance with the claim 5, wherein the opposing surface is made of a braking material.

7. Bench in accordance with claim 1, wherein the pressure surface allows rotation of the cap during thrust.

8. Bench in accordance with claim 7, wherein the pressure surface is made of a sliding material.

* * * * *